United States Patent
Su et al.

(10) Patent No.: US 8,732,326 B2
(45) Date of Patent: *May 20, 2014

(54) DYNAMIC ADJUSTMENTS OF VIDEO STREAMS

(75) Inventors: George P. Su, Stanford, CA (US); John K. Murata, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 47 days.
This patent is subject to a terminal disclaimer.

(21) Appl. No.: 13/094,605

(22) Filed: Apr. 26, 2011

(65) Prior Publication Data
US 2011/0202674 A1    Aug. 18, 2011

Related U.S. Application Data

(63) Continuation of application No. 11/592,765, filed on Nov. 3, 2006, now Pat. No. 7,962,637.

(51) Int. Cl.
| | |
|---|---|
| G06F 15/16 | (2006.01) |
| H04N 7/173 | (2011.01) |
| H04N 21/24 | (2011.01) |
| H04N 21/234 | (2011.01) |
| H04N 21/472 | (2011.01) |
| H04N 21/262 | (2011.01) |
| H04N 7/30 | (2006.01) |

(52) U.S. Cl.
CPC ...... *H04N 21/2401* (2013.01); *H04N 21/23406* (2013.01); *H04N 21/47205* (2013.01); *H04N 21/26233* (2013.01); *H04N 7/3038* (2013.01); *H04N 2012/5682* (2013.01); *H04N 2012/6489* (2013.01); *H04N 1/1874* (2013.01); *H04N 29/06027* (2013.01); *H04N 29/06462* (2013.01); *H04N 47/10* (2013.01)
USPC .............. 709/231; 709/233; 725/94; 725/116

(58) Field of Classification Search
CPC ..................... H04L 1/1874; H04L 2012/5682; H04L 2012/6489; H04L 29/06027; H04L 29/06462; H04L 47/10; H04N 7/3038; H04N 21/23406; H04N 21/2401; H04N 21/26233; H04N 21/47205

USPC .............. 709/230–234; 725/94, 95, 114, 115, 725/116, 117; 370/229–234
See application file for complete search history.

(56) References Cited

U.S. PATENT DOCUMENTS

| | | | |
|---|---|---|---|
| 5,721,956 A | * | 2/1998 | Martin et al. .................... 710/52 |
| 5,870,557 A | | 2/1999 | Bellovin et al. |

(Continued)

FOREIGN PATENT DOCUMENTS

| | | |
|---|---|---|
| WO | WO 2004/093451 A2 | 10/2004 |

OTHER PUBLICATIONS

N. Cranley et al., "Adaptive Quality of Service for Streamed MPEG-4 over the Internet," (5 pages).

(Continued)

*Primary Examiner* — Luat Phung
*Assistant Examiner* — Kai Chang
(74) *Attorney, Agent, or Firm* — Kenyon & Kenyon LLP

(57) ABSTRACT

A method and apparatus for the dynamic adjustments of video streams sent from a server to a client is provided. Using both short term and long term thinning mechanisms, the server reduces its data transfer rate when bandwidth is reduced and increases its data transfer rate when bandwidth is available. In the short term mechanism, the server will dynamically adjust the transmission rate of the video or the quality of the video based on parameters returned by the client. These parameters include currently-buffered data-size, buffered-data duration, and packet loss rate. In the long term mechanism, the server will adjust the current maximum quality level allowed depending upon the round trip times of data packets transmitted. This invention decreases client rebuffering and packet loss and increases the efficiency of available bandwidth.

30 Claims, 4 Drawing Sheets

(56) References Cited

U.S. PATENT DOCUMENTS

| | | | |
|---|---|---|---|
| 5,963,202 A | 10/1999 | Polish | |
| 6,044,396 A | 3/2000 | Adams | |
| 6,124,878 A | 9/2000 | Adams et al. | |
| 6,175,871 B1 | 1/2001 | Schuster et al. | |
| 6,292,834 B1* | 9/2001 | Ravi et al. | 709/233 |
| 6,625,656 B2 | 9/2003 | Goldhor et al. | |
| 6,789,123 B2 | 9/2004 | Li et al. | |
| 7,047,308 B2* | 5/2006 | Deshpande | 709/232 |
| 7,054,911 B1 | 5/2006 | Lango et al. | |
| 7,076,544 B2 | 7/2006 | Katz et al. | |
| 7,346,007 B2 | 3/2008 | Curcio et al. | |
| 7,373,419 B2* | 5/2008 | Connor et al. | 709/235 |
| 7,392,322 B2* | 6/2008 | Ido et al. | 709/233 |
| 7,450,508 B2 | 11/2008 | Cha et al. | |
| 7,478,164 B1* | 1/2009 | Lango et al. | 709/231 |
| 7,558,869 B2* | 7/2009 | Leon et al. | 709/231 |
| 7,571,244 B2* | 8/2009 | Costanzo et al. | 709/231 |
| 7,571,246 B2* | 8/2009 | Virdi et al. | 709/232 |
| 7,640,352 B2* | 12/2009 | Klemets et al. | 709/231 |
| 7,647,614 B2* | 1/2010 | Krikorian et al. | 725/94 |
| 7,657,645 B2* | 2/2010 | Xu | 709/231 |
| 7,751,436 B2* | 7/2010 | Read | 370/468 |
| 2002/0105951 A1 | 8/2002 | Hannuksela et al. | |
| 2002/0194609 A1* | 12/2002 | Tran | 725/95 |
| 2004/0066742 A1 | 4/2004 | Varsa et al. | |
| 2004/0257991 A1 | 12/2004 | Sterne et al. | |
| 2004/0267956 A1* | 12/2004 | Leon et al. | 709/231 |
| 2005/0021830 A1* | 1/2005 | Urzaiz et al. | 709/234 |
| 2006/0095401 A1 | 5/2006 | Krikorian et al. | |
| 2007/0133405 A1 | 6/2007 | Bowra et al. | |
| 2008/0022005 A1* | 1/2008 | Wu et al. | 709/231 |
| 2008/0089239 A1 | 4/2008 | Todd et al. | |

OTHER PUBLICATIONS

N. Cranley et al., "Perceptual Quality Adaptation (PQA) Algorithm for 3GP and Multi-Tracked MPEG-4 Content Over Wireless IP Networks," (6 pages).

Muntean et al., "A New Adaptive Multimedia Streaming System for All-IP Multi-Service Networks" IEEE Transactions on Broadcasting, Manuscript received Dec. 13, 2002, pp. 1-10.

Schulzrinne et ai., "RTP: A Transport Protocol for Real-Time Appiications", RFC 3550, Jul. 2003, http://www. faqs.org/rfc3550.html.

3n:J Generation Partnership Project; Technical Specification Group Services and System Aspects; Transparent end-to-end Packet-switched Streaming Service (PSS); Protocols and codecs (Release 6), http://3ggg.org/ftg/SI2ecs/archive/26 series/26.234/26234-690. Zi12. 3GPP Organisational Partners, 2006, pp. 1-128.

\* cited by examiner

Current Maximum Quality Level of Data Stream

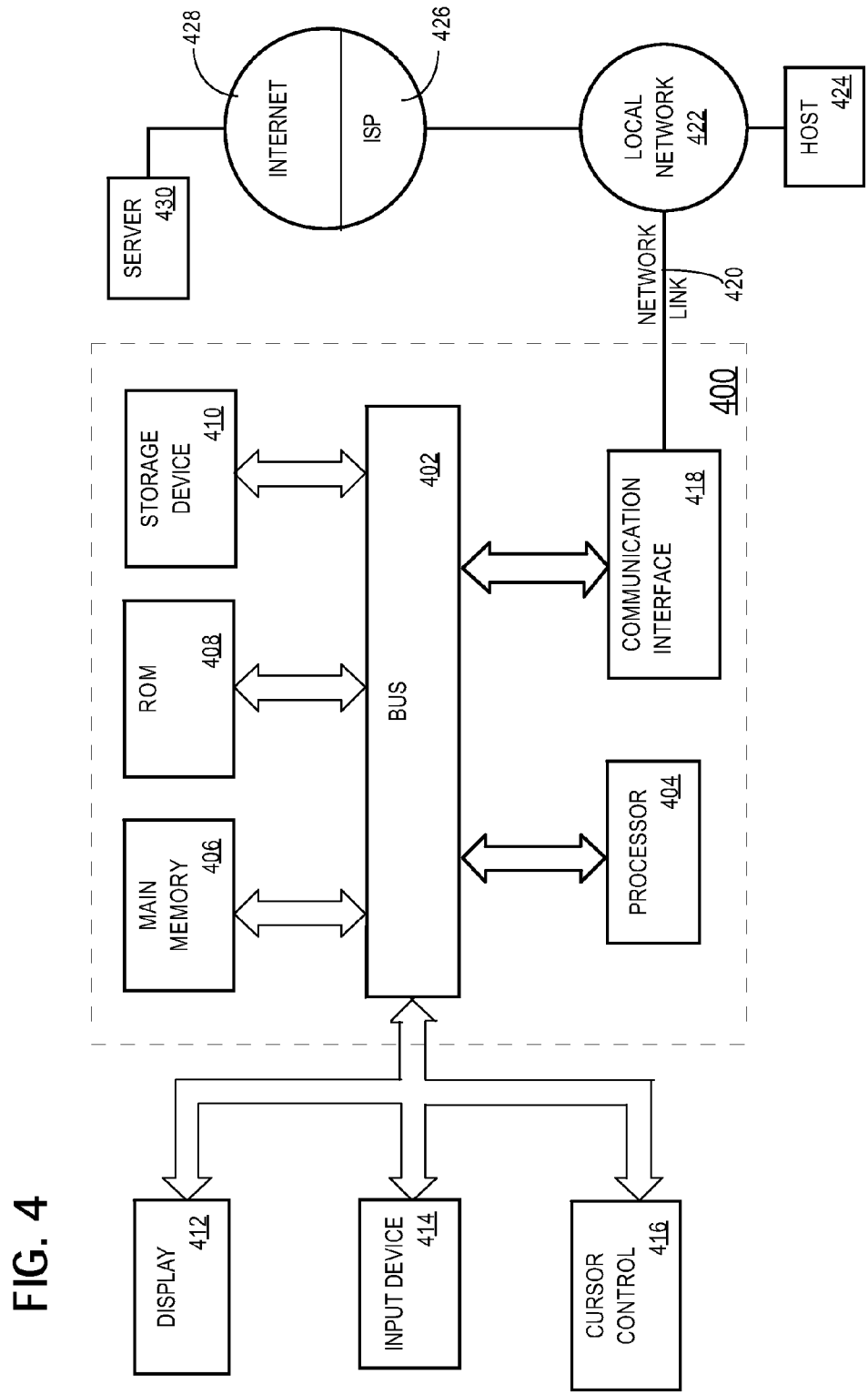

DYNAMIC ADJUSTMENTS OF VIDEO STREAMS

PRIORITY CLAIM

This application is a continuation of U.S. application Ser. No. 11/592,765, entitled "DYNAMIC ADJUSTMENTS OF VIDEO STREAMS", filed on Nov. 3, 2006, by George P. Su, et al. The entire contents of the above-referenced application are hereby incorporated by reference.

BACKGROUND

Field of the Invention

The present invention relates to streaming video from a server to a client.

The use of multimedia content on computing devices has increased substantially. Multimedia content is sent from a central server as streaming video and audio files. Streaming of video from a server to a client requires a server, a client and a network. The server transmits the content, the client receives and plays the content and the network transfers the data from the server to the client. The server sends out data in small chunks, called data packets, through the network to a client. The client receives the data packets which are then combined together to form the video program and played.

Different protocols are employed to send data through a network including TCP, Reliable UDP and UDP Streaming. TCP or transport control protocol creates connections between servers and clients and guarantees reliable and in-order delivery of data from the server to the client. Reliable UDP, or reliable user datagram protocol, incorporates quality of service enhancements that improve the ability of real time streaming of data and provides pseudo-guarantees of delivery. Reliable UDP retransmits data that has not been received by the client until it detects that the data is late for real time streaming of content. Finally, in UDP streaming, there is no guarantee that the information sent by the server is received by the client. Rather, the data is sent by the server to the client without any retransmission. However, the client will report back to the client any packet loss that has occurred.

The client can be a variety of devices such as a desktop or laptop computer. The client can also be a mobile device, an evolving category that currently includes but is not limited to cellular telephones, personal data assistants (PDAs) and mobile gaming consoles. For mobile devices, protocols have been developed to regulate the sending and receiving of data, one of which is 3GPP (3rd Generation Partnership Project). When the content is streamed, the bandwidth reaching that client may fluctuate. These fluctuations are the result of natural conditions affecting the transmission of data and from congestion in the data network itself. The result of these fluctuations may be interruption of the streaming video or underutilization of available bandwidth.

Content providers have resolved these difficulties in a number of ways. One prior approach is to make several versions of the same content with different qualities of video. For example, a content provider provides two versions of a program, one lower resolution for lower bandwidth, and one higher resolution for higher bandwidth capabilities. The provider initially detects what the user is capable of receiving and sends her the appropriate version, an action called stream switching. Difficulties arise if the network bandwidth changes midstream. The provider may not be able to make adjustments to the stream dynamically.

In another prior approach, the content provider produces two independent versions of a program that is not based on resolution or bandwidths. For instance, a video program is made with one version showing the program from the point of view of the hero and the other from the point of view of the villain. The user indicates which version she wishes to view and the server sends that version to the client.

The provider may also wish to provide more versions of a program to stream which allows for more variation of bandwidths. Different cellular telephone models exhibit different reception rates and different telephone carriers provide different transmission rates. To provide the highest quality content to the user, content providers would create a version of their programming for each carrier and telephone model. However, this results in greater expenses to create and store additional versions of the same program.

Another prior approach is to compress the streamed multimedia content to the user as it is being transmitted. The available bandwidth can be detected and the content is compressed to a necessary size in order to ensure smooth delivery. However, this entails more computing resources each time the number of users increases. To compress and stream a program to five users would not be difficult, but the computing resources required to compress and stream to ten thousand individual users presents a challenge.

Another prior approach in which to decrease the amount of data being sent by the server is to selectively remove frames from the video program. In this method, the program is pre-created and stored on the server. Video programs are essentially still frames being shown at a rapid rate. Because the frame rate is high, the viewer is tricked into believing there is actual motion.

The server analyzes the video program and based on an algorithm, makes decisions that indicate which frames are more important than others. The frames which are deemed important are the "key frames". When the bandwidth of the network decreases and the data transmission rate must be lowered, the server selectively removes non-key frames from the video, but the audio portion of the program remains intact. This process is called "thinning". The client receives the video program with the frames removed. The video may appear jerky because of the missing frames but the user is able to view the program primarily intact. Based on quality of service considerations, the audio portion of the program is not interrupted so that the viewing experience is improved.

Based on the foregoing, it is clearly desirable to provide a mechanism that allows content providers to dynamically change the quality and transmission rate of multimedia content based on fluctuating bandwidth. It is further desirable to provide a mechanism for allowing content providers to present their offerings in various bandwidths without creating multiple versions of the same program. It is also desirable to provide a mechanism for adjusting the quality of a program and making it available to many users without the use of data compression. It is also desirable to provide a mechanism for dynamically adjusting the amount of data transmitted to make the most efficient use of available bandwidth.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of a computer system on which embodiments of the invention may be implemented.

DETAILED DESCRIPTION

Figure 1:
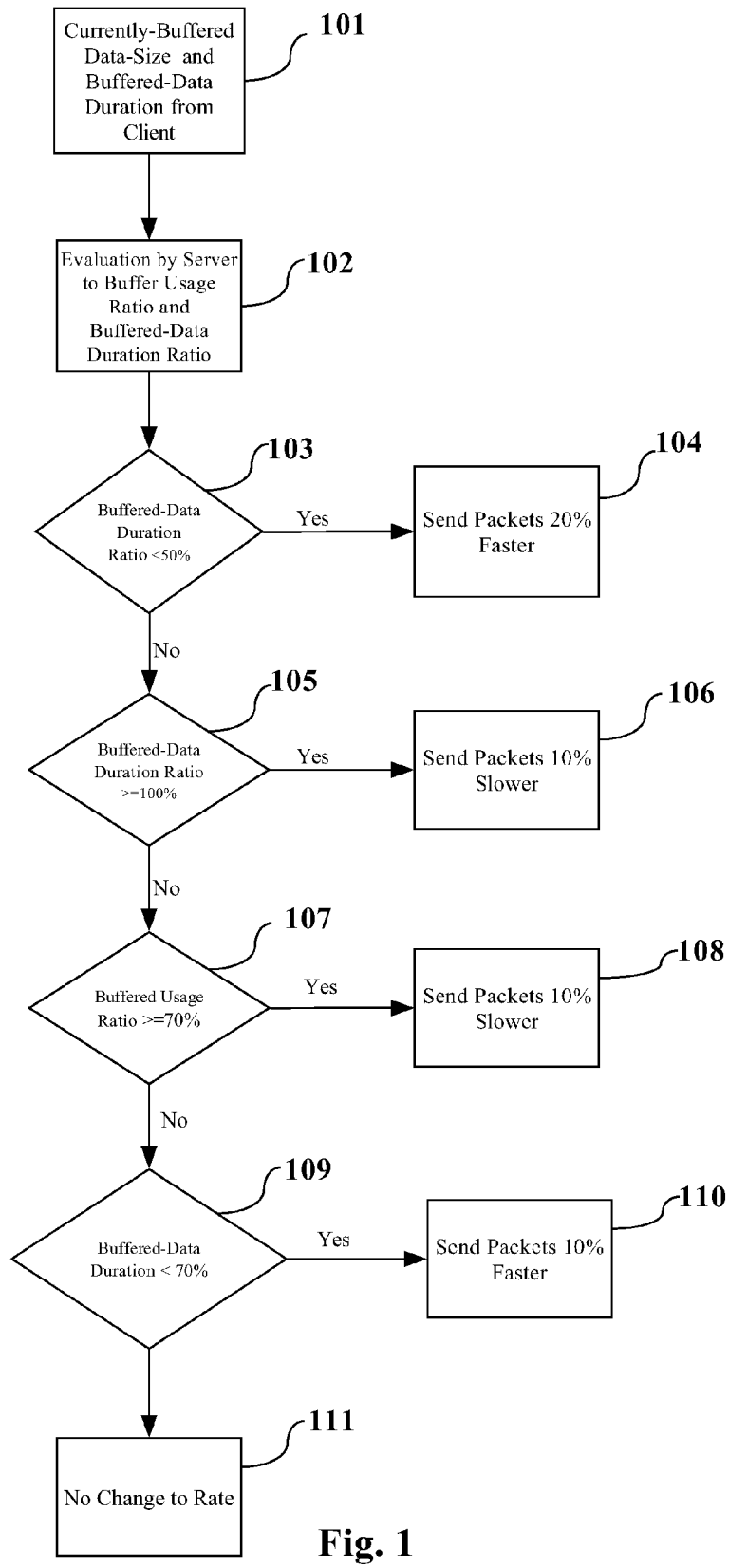
FIG. 1 is a flowchart depicting the procedure for determining the degree of adjustment made to data transmission rate, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Techniques are provided for a method and system for delivering streaming video from a server to a client. In one aspect, a server dynamically adjusts the rate the data is transmitted or the quality of video that is being delivered based on information returned by the client. In response to the information from the client reaching certain predetermined thresholds, the data transmission rate can be increased or decreased and the quality of the video can be increased or decreased. The quality of video is adjusted by using one of a variety of compression techniques. Each stream has a definitive maximum and minimum quality level that cannot be changed based on the video file itself and the adjustments are made within these values.

According to another aspect, the current maximum quality level is determined based upon information received from the client. While sending the video to the client, the server adjusts parameters that govern sending the video to ensure that the video quality of the data sent to the client does not exceed the maximum quality level specified by the client.

In one embodiment of the invention, the server stores pre-created content. When a user or many users wish to view the pre-created content, the server begins streaming the file to the user. The files are streamed using pre-processed optimized media files that contain tables of time referenced instructions with each reference describing how to quickly generate a network packet from the media file. The use of pre-processed optimized media files allows the system to conserver computer resources and stream files to many more clients simultaneously. There is a short term thinning mechanism which adjusts both the transmission rate of the data and the quality of the video transmitted. A longer term mechanism adjusts only the current maximum quality level of the video transmitted based on network congestion.

Client-Side Buffering

In one embodiment of the invention, data is sent by the server and the client receives the streaming video data. The client stores this information in a buffer, which is a short-term, temporary storage memory area. The buffer allows smoother playback of video by providing continuous data for playback even if the data stream is interrupted for short periods. For example, when a video program is first streamed to a client, the server sends this data in faster than real time. The client begins playing the video program in real time, but because it is receiving data for parts of the video that have not yet been played, the unplayed parts of the video are stored in the buffer for later use.

According to one embodiment, a client sends to the server an indication of the size of the buffer that will be receiving the video data. The currently-buffered data-size specified by the client is referred to hereafter as "target buffer size". When the video begins to stream, the buffer is empty. As the program progresses and the server continues to send more data, the buffer begins loading with data. If the buffer is full and the server continues to send information, the data can no longer be stored in the buffer and is lost, a situation known as buffer overflow. The reverse can occur as well. If the data sent to the client becomes disrupted, the playing of video reduces the amount of data in the buffer. If the data is not replenished with new streams of data, the buffer could run out, a situation called buffer underrun. Should a buffer underrun occur, playback of the video is interrupted on the client as the buffer is replenished. This is also known as client rebuffering.

In another embodiment, a client will send to the server the target buffer size and a minimum buffer level. The minimum buffer level is the buffer level which the server must maintain or the client will begin to rebuffer.

Measures of Buffered Video

The video that currently resides in a client's buffer may be measured in a variety of ways. For example, the video can be measured by the number of bytes of video data that are currently stored in the buffer. This measure is referred to hereafter as "currently-buffered data-size".

On the other hand, the video that currently resides in the client's buffer can be measured by the duration or time required for the client to play the video data that are currently stored in the buffer. This measure is referred to hereafter as the "buffered-data duration".

On the Fly Adjustments

The network connection from the server to the client can be unstable with constant fluctuations. Such fluctuations can be caused by a natural physical obstruction of the network or by congestion within the network. At times, the available bandwidth can be extensive and capable of delivering a very high quality video feed. At other times, when congestion or physical parameters cause the bandwidth to be limited, the amount of data sent must be reduced, which can be accomplished by lowering the transmission rate or the quality of the video.

When bandwidth of the streamed data needs to be changed, the server can adjust the transmission rate of the data packets and modify the quality level of the video program. Packet transmission rates can be adjusted both up and down. The quality of the video program can be modified using a thinning technique.

Different methods of reducing the amount of data transmitted are used. In one embodiment, dynamic data compression can be used wherein the amount of data transmitted is controlled by dynamically adjusting the compression used for the video. In another embodiment, the video content versions are switched to use the version most efficient for the currently available bandwidth.

In another embodiment, switching video content versions can be performed dynamically. As bandwidth of the network fluctuates, the version transmitted by the server adjusts midstream. This is performed by marking the time of the video and sending new versions of the video based upon the time of the bandwidth change.

In another embodiment, dynamically switching the video content versions, or stream switching, can be combined with thinning and thickening techniques. Here, small changes in bandwidth result in thinning and thickening of frames for a certain bandwidth version. If a larger change in bandwidth occurs, the server switches video content versions to deliver the best quality video based on the bandwidth. The invention is not limited to these listed embodiments but can include any technique used to adjust the amount of data transmitted.

In another embodiment, thinning and thickening techniques with stream switching is performed differently. Here, as the bandwidth improves, thinning slowly decreases for a version of the video file. At a certain threshold, the video version can no longer be thinned and the server will change the version of the video to one of higher resolution. The new version of the video has already had many frames removed. As the bandwidth improves, the thinning is decreased for the video file until once again, the video is shown with no thinning. At that threshold, the server can again decide to change versions of the file to a higher resolution version. In other embodiments, there can be more threshold levels and differing combinations of thinning and switching versions. In another embodiment, when bandwidth is decreased, the videos are thinned with threshold levels causing switches to videos with less resolution.

Server-Side Adjustments Based on Client-Provided Information

In one embodiment of the invention, the server adjusts the parameters that govern transmitting video data based on information that the client sends to the server. Specifically, the client sends information to the server based upon a mobile communications protocol. An example of a protocol is the 3GPP protocol. However, the invention is not limited to 3GPP, and any available communications protocol can be used. The client initially sends (a) a target buffer size and (b) a target buffered-data duration to the server. The target buffered-data duration is the desired buffered-data duration for that particular client.

After the target buffer size and the target buffered-data duration are sent to the server, the client continuously provides additional information as the data packets are being transmitted. This information may include, for example, an acknowledgement of the last packet that has been received by the client, the number of data packets lost in transmission, and the currently-buffered data-size and the buffered-data duration in the client.

In another embodiment, the buffered-data duration is calculated at the server. Here, the client sends the currently-buffered data-size, an indication of the last-acknowledged packet and the next-to-play frame. The last-acknowledged packet is the latest packet to which the client sends an acknowledgement to the server that it has been received. The 'next-to-play frame' is, in actuality, the next Application Data Unit (ADU) or the application's natural unit of data that will be used next in the buffer. In video, the ADU may consist of a full video frame, a partial video frame or any other data unit associated with video. For simplicity, the next ADU will hereinafter be referred to as the 'next-to-play frame.' In addition, the client reports the time difference between the next-to-play frame and the current time from the client's perspective, known herein as 'play time difference'. To calculate the buffered-data duration, the play time difference is added to the difference between the time associated with the last-acknowledged packet and the time associated with the next-to-play frame.

In another embodiment, the server calculates the buffered-data duration by determining the difference between the time associated with the last-acknowledged packet and the time associated with the next-to-play frame.

The server then determines ratios based on both the currently-buffered data-size and the buffered-data duration. Specifically, the server calculates a "buffer usage ratio" based on the currently-buffered data-size relative to the target buffer size. In addition, the server calculates a "buffered-data duration ratio" based on the buffered-data duration relative to the target buffered-data duration.

In another embodiment, the server will adjust the data stream based only on the packet loss and the desire to maintain a certain value for the buffered-data duration, twenty-five seconds for example. If the buffered-data duration is less than twenty-five seconds, the transmission rate of packets will be increased until the duration is reached. If the packet loss is high, then the data transmission rate is decreased to reduce network congestion.

In another embodiment, the adjustment to the data stream is only made to the video portion of the streaming video. To increase the quality of the video program to the user, adjustments are made only to the video portion of the program and the audio portion is not adjusted. Users are more tolerant of a small decrease in the picture quality but less tolerant of audio drop-out.

FIG. 1 is a flowchart illustrating steps for one embodiment to adjust the server's transmission rate of the packets that contain video data upon the receipt of a data packet. The transmission rate of the packets is increased by reducing the time delay between sending consecutive packets. The transmission rate of the packets is decreased by increasing the time delay between sending consecutive packets. Specific numbers are included for illustrative purposes only and the embodiment can be implemented using any range of values. In FIG. 1, the server adjusts the transmission rate of the data packets based upon the currently-buffered data-size ratio and the buffered-data duration ratio. Specifically, in Step 101 of FIG. 1, the process begins when the server receives the currently-buffered data-size and buffered-data duration from the client.

Next in Step 102, the currently-buffered data-size and buffered-data duration are evaluated by the server. The currently-buffered data-size is compared against the target buffer size to find a buffer usage ratio, and the buffered-data duration is compared against the target buffered-data duration in order to find a buffered-data duration ratio. Though not illustrated, the target buffer size and the target buffered-data duration were previously received by the server from the client.

The server attempts to attain a safe, minimum buffered-data duration by maintaining a specified buffered-data duration ratio. In this example, a 50% buffered-data duration ratio is maintained regardless of any other factor. In Step 103, the server determines if the buffered-data duration ratio is less than 50%. If the buffered-data duration ratio is below 50%, data packets are transmitted by the server at a faster rate. In Step 104, the rate is increased by 20%. If the buffered-data duration is above 50%, the server proceeds to the next test.

Next, the server determines if the buffered-data duration is equal to or greater than the target buffered-data duration. In Step 105, this is performed by examining if the buffered-data duration ratio is greater than or equal to 100%. If the buffered-data duration ratio is greater than or equal to 100%, then the packets are slowed by a percentage. Step 106 slows the packet transmission rate by 10%.

The server next examines the buffer usage ratio and tries to maintain a desired value. If the buffer usage ratio is greater than or equal to a desired value, then the server tries to decrease the buffer usage ratio. Because the target buffer size is fixed, the server increases the buffer usage ratio by enlarging the currently-buffered data-size.

As shown in Step 107, if the buffer usage ratio is greater than or equal to 70%, then the packet transmission rate is decreased. In Step 108, packets are slowed by 10%.

The server will then determine if the buffered-data duration is less than the target buffered-data duration. If the buffered-data duration is less, then packets will be sent faster. In Step 109, the server determines if the buffered-data duration ratio is below 70%. If the buffered-data duration ratio is below 70%, then data packets are sent 10% faster 110. If the buffered-data duration ratio is not below 70%, then the server makes no change to the data packet transmission rate 111.

The values given in this example are only for illustration and the actual values employed and amount of adjustment will vary from implementation to implementation.

Dynamic Quality Level Adjustments

According to one embodiment, the server also adjusts the quality level of the video stream based upon the buffer usage ratio and the buffered-data duration ratio values. Adjusting the quality level of the video stream and adjusting the transmission rate of the video stream are independently determined. Adjusting the quality level refers to thinning, or removing video frames from the stream. If the thinning level is zero, no video frames are removed from the stream.

According to one embodiment, quality level adjustments are made gradually so as not to overreact to short-term anomalies. For example, in one embodiment, in order to not increase the quality level of the video stream too quickly, increases are made additively, or, for example, in increments of 10%. On the other hand, decreases in quality level are made multiplicatively, decreasing the quality level by half.

Figure 2:
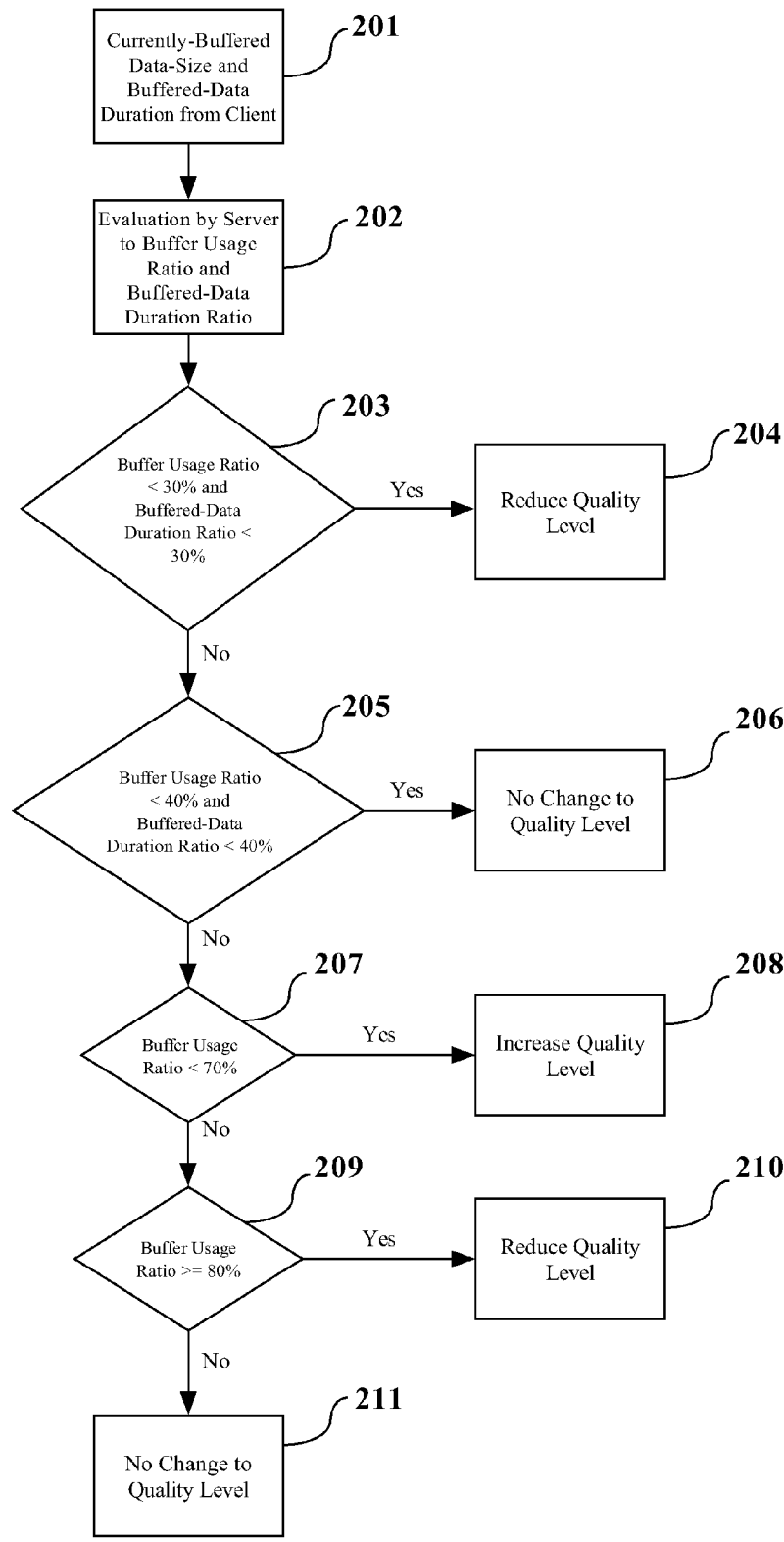
FIG. 2 is a flowchart depicting the procedure for determining the degree of adjustment made to the quality level of the content, according to one embodiment of the invention.

FIG. 2 demonstrates one embodiment to adjust quality levels upon the receipt of a data packet. The values given in this example are only for illustration and the actual values employed and amount of adjustment will vary from implementation to implementation. In Step 201 of FIG. 2, the process begins when the server receives the currently-buffered data-size and buffered-data duration from the client. Next in Step 202, the currently-buffered data-size and buffered-data duration are evaluated by the server. The currently-buffered data-size is compared against the target buffer size to find buffer usage ratio and buffered-data duration is compared against the target buffered-data duration in order to find buffered-data duration ratio.

In Step 203, if the buffered-data duration ratio and the buffer usage ratio are both less than 30%, then the server reduces the quality level 204. The reasons for this are twofold. With both buffered-data duration ratio and buffer usage ratio low, reducing the quality level avoids network congestion and prevent buffer underflow.

In Step 205, if the buffered-data duration ratio and the buffer usage ratio are both below 40%, then the quality level is left unchanged 206. In this situation, the client is still in danger of buffer underflow.

The server next examines the buffer usage ratio and tries to maintain that value within a certain desired range. With Step 207, if the server finds that the buffer usage ratio is less than 70%, the quality of the video stream is increased 208. This will avoid overflowing the buffer.

Step 209 determines if the buffer usage ratio is greater than or equal to 80%. If it is greater than or equal to 80%, the quality level is reduced 210. If it is not greater than or equal to 80%, the quality level is left unchanged 211.

In one embodiment, the amount of data packets lost is returned to the server by the client. The server determines the packet loss ratio by comparing the number of packets lost with the total number of packets transmitted. If the packet loss ratio is more than 10%, then the server also reduces the quality level.

In one embodiment, the reported buffered-data duration and currently-buffered data-size for the client at the start of a stream would be very low. If no additional conditions were present at the beginning of a video stream, the server would make adjustments in an attempt to correct for these low values.

To prevent unnecessary adjustments on the outset of a new video stream, the mechanism for both quality level and rate transmission level does not execute until certain conditions are reached. The buffered-data duration ratio and buffer usage ratio must first reach at least 30% each and the video must be played for at least the target buffered-data duration in order for the server side mechanisms to begin adjusting the stream.

Current Maximum Quality Level

The current maximum quality level is a long term adjustment made to the video stream and is based upon the congestion of the network. The long term adjustment is to ensure that changes are not due to one-time peaks or valleys in network congestion. The current maximum quality level specifies a limit that defines the best and most data-intensive level that the server may use to send video to a client.

Figure 3:
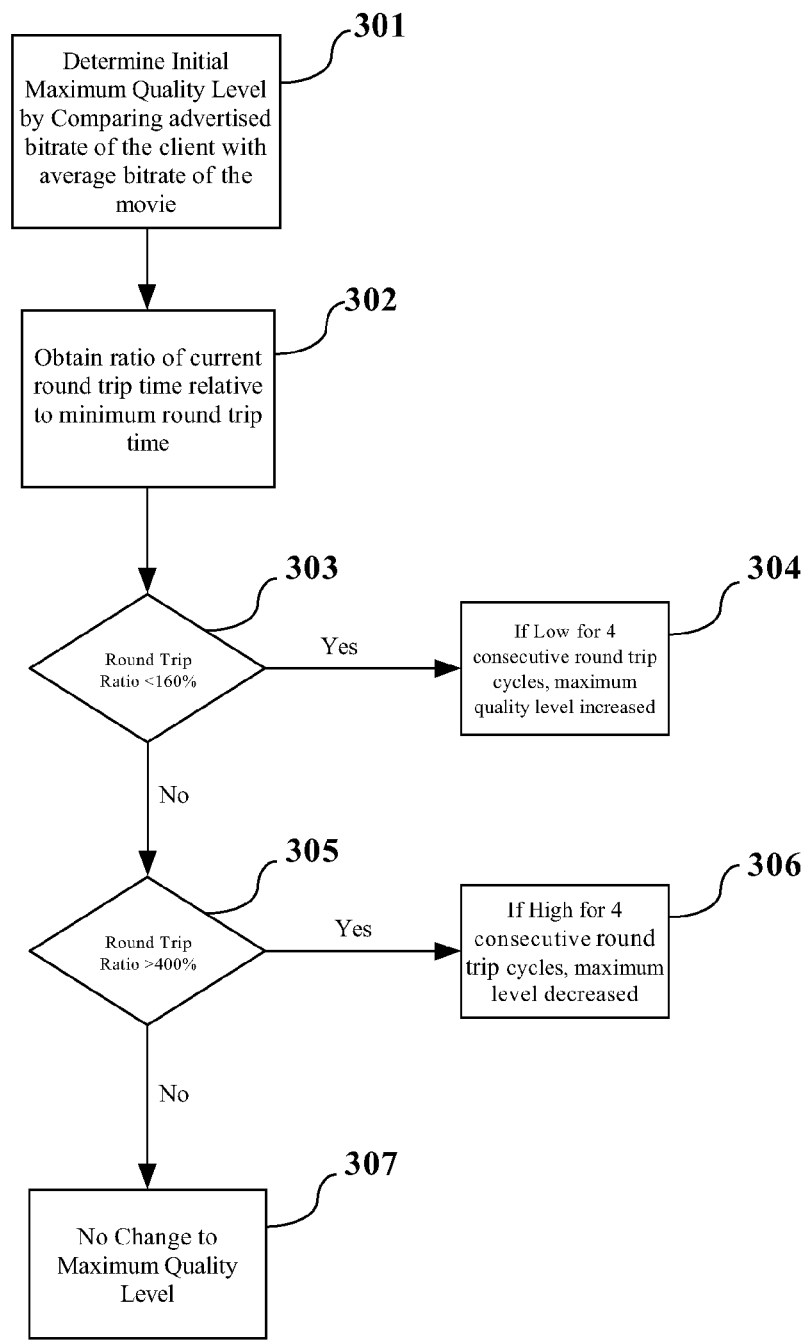
FIG. 3 is a flowchart depicting the procedure for determining the degree of adjustment to the current maximum quality level of content, according to one embodiment of the invention.

In one embodiment, as presented in FIG. 3, the initial current maximum quality level is determined by comparing the advertised bitrate of the client with the average bitrate of the video 301. The advertised bitrate of the client is a value sent by the client to the server and represents the maximum rate of data that the client is capable of receiving from the server. The average bitrate of the video is an average of the amount of data used to display the movie content in its current format.

Next, in order to determine the congestion of the network, the current round trip time of a data packet is calculated by the server. The server measures the amount of time elapsed between when a data packet is sent by the server to the client and when the acknowledgement to that data packet sent by the client is received by the server. This measurement is compared relative to the minimum value received for other data packet round trip times sent to that client 302. That evaluation, in percentage, is the "round trip ratio".

In an embodiment, this information is sent using RTCP or Real-time Transport Control Protocol. This is a sister protocol of RTP or Real-time Transport Protocol and provides delivery and packaging information of multimedia data. The primary function of RTCP is to provide feedback on the quality of service being provided by the multimedia streaming.

The values given in this example are only for illustration and the actual values employed and amount of adjustment will vary from implementation to implementation. As shown in Steps 303 and 304, if the round trip ratio is small, or less than 160% for four consecutive round trip cycles, then the current maximum quality level is additively increased. This shows that the congestion of the network is low and that the amount of data sent can be increased.

From Steps 305 and 306, if the round trip ratio is large, or greater than 400% for four consecutive round trip cycles, then the bandwidth is constrained and the current maximum quality level is additively decreased. If the round trip ratio falls between 160% and 400%, there is no change made to the current maximum quality level.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by a server to stream data to a client, comprising:
   while streaming data to the client:
      determining an adjustment to be made to a parameter that governs streaming of the data to the client, wherein the adjustment is determined based at least in part upon a buffer usage metric and a duration metric for the client, wherein the buffer usage metric reflects a relationship between a current buffered data size, which indicates a size of data currently stored in a client buffer, and a target buffered data size, and wherein the duration metric reflects a relationship between a current buffered data duration, which indicates an amount of time the client will take to consume the data currently stored in the client buffer, and a target buffered data duration;
      receiving information from the client indicating the current buffered data size and the current buffered data duration; and
      adjusting the parameter in accordance with the adjustment;
   wherein the method is performed by the server.

2. The method of claim 1, further comprising:
   deriving the buffer usage metric based at least in part upon the current buffered data size and the target buffered data size, and the duration metric based at least in part upon the current buffered data duration and the target buffered data duration.

3. The method of claim 1, wherein the parameter is a data transmission rate, and wherein determining the adjustment to be made to the parameter comprises:
   determining whether the duration metric is less than a first threshold; and
   in response to a determination that the duration metric is less than the first threshold, concluding that the adjustment to be made is to increase the data transmission rate.

4. The method of claim 3, wherein determining the adjustment to be made to the parameter further comprises:
   determining whether the duration metric is greater than a second threshold that is higher than the first threshold; and
   in response to a determination that the duration metric is greater than the second threshold, concluding that the adjustment to be made is to decrease the data transmission rate.

5. The method of claim 4, wherein determining the adjustment to be made to the parameter further comprises:
   determining whether the buffer usage metric is greater than a third threshold; and
   in response to a determination that the buffer usage metric is greater than the third threshold, concluding that the adjustment to be made is to decrease the data transmission rate.

6. The method of claim 5, wherein determining the adjustment to be made to the parameter further comprises:
   determining whether the duration metric is less than a fourth threshold, which is between the first threshold and the second threshold; and
   in response to a determination that the duration metric is less than the fourth threshold, concluding that the adjustment to be made is to increase the data transmission rate.

7. The method of claim 6, wherein the buffer usage metric and the duration metric are ratios, and wherein the first threshold is approximately fifty percent, the second threshold is approximately one hundred percent, the third threshold is approximately seventy percent, and the fourth threshold is approximately seventy percent.

8. The method of claim 1, wherein the parameter is a data quality level, and wherein determining the adjustment to be made to the parameter comprises:
   determining whether the buffer usage metric is less than a first threshold and whether the duration metric is less than a second threshold; and
   in response to a determination that the buffer usage metric is less than the first threshold and the duration metric is less than the second threshold, concluding that the adjustment to be made is to decrease the data quality level to cause lower quality data to be streamed to the client.

9. The method of claim 8, wherein determining the adjustment to be made to the parameter further comprises:
   determining whether the buffer usage metric is less than a third threshold and whether the duration metric is less than a fourth threshold, wherein the third threshold is higher than the first threshold and the fourth threshold is higher than the second threshold; and
   in response to a determination that the buffer usage metric is less than the third threshold and the duration metric is less than the fourth threshold, concluding that the adjustment to be made is to not adjust the data quality level.

10. The method of claim 9, wherein determining the adjustment to be made to the parameter further comprises:
    determining whether the buffer usage metric is less than a fifth threshold, which is higher than the third threshold; and
    in response to a determination that the buffer usage metric is less than the fifth threshold, concluding that the adjustment to be made is to increase the data quality level to cause higher quality data to be streamed to the client.

11. The method of claim 10, wherein determining the adjustment to be made to the parameter further comprises:
    determining whether the buffer usage metric is greater than a sixth threshold, which is higher than the fifth threshold; and
    in response to a determination that the buffer usage metric is greater than the sixth threshold, concluding that the adjustment to be made is to decrease the data quality level to cause lower quality data to be streamed to the client.

12. The method of claim 11, wherein the buffer usage metric and the duration metric are ratios, and wherein the first threshold is approximately thirty percent, the second threshold is approximately thirty percent, the third threshold is approximately forty percent, the fourth threshold is approximately forty percent, the fifth threshold is approximately seventy percent, and the sixth threshold approximately eighty percent.

13. The method of claim 1, wherein the data is video data and the amount of time the client will take to consume the data currently stored in the client buffer includes a time it will take to play the content of the video data stored in the client buffer.

14. The method of claim 1, further comprising the server receiving the target buffered data size and the target buffered data duration from the client.

15. The method of claim 1, wherein the server determines the buffered data duration based on the data sent to the client.

16. The method of claim 1, further comprising the server receiving from the client a size of the client buffer that is receiving the data.

17. A non-transitory machine readable storage medium storing instructions which, when executed by one or more processors of a server, cause the server to perform the method of claim 1.

18. A non-transitory machine readable storage medium storing instructions which, when executed by one or more processors of a server, cause the server to perform the method of claim 2.

19. A non-transitory machine readable storage medium storing instructions which, when executed by one or more processors of a server, cause the server to perform the method of claim 3.

20. A non-transitory machine readable storage medium storing instructions which, when executed by one or more processors of a server, cause the server to perform the method of claim 4.

21. A non-transitory machine readable storage medium storing instructions which, when executed by one or more processors of a server, cause the server to perform the method of claim 5.

22. A non-transitory machine readable storage medium storing instructions which, when executed by one or more processors of a server, cause the server to perform the method of claim 6.

23. A non-transitory machine readable storage medium storing instructions which, when executed by one or more processors of a server, cause the server to perform the method of claim 7.

24. A non-transitory machine readable storage medium storing instructions which, when executed by one or more processors of a server, cause the server to perform the method of claim 8.

25. A non-transitory machine readable storage medium storing instructions which, when executed by one or more processors of a server, cause the server to perform the method of claim 9.

26. A non-transitory machine readable storage medium storing instructions which, when executed by one or more processors of a server, cause the server to perform the method of claim 10.

27. A non-transitory machine readable storage medium storing instructions which, when executed by one or more processors of a server, cause the server to perform the method of claim 11.

28. A non-transitory machine readable storage medium storing instructions which, when executed by one or more processors of a server, cause the server to perform the method of claim 12.

29. A server, comprising:
one or more processors; and
a storage medium storing instructions which, when executed by the one or more processors, cause the one or more processors to perform:
while streaming data to a client:
determining an adjustment to be made to a parameter that governs streaming of the data to the client, wherein the adjustment is determined based at least in part upon a buffer usage metric and a duration metric for the client, wherein the buffer usage metric reflects a relationship between a current buffered data size, which indicates a size of data currently stored in a client buffer, and a target buffered data size, and wherein the duration metric reflects a relationship between a current buffered data duration, which indicates an amount of time the client will take to consume the data currently stored in the client buffer, and a target buffered data duration;
receiving information from the client indicating the current buffered data size and the current buffered data duration; and
adjusting the parameter in accordance with the adjustment.

30. The server of claim 29, wherein the instructions cause the one or more processors to further perform the following operations:
deriving the buffer usage metric based at least in part upon the current buffered data size and the target buffered data size, and the duration metric based at least in part upon the current buffered data duration and the target buffered data duration.

* * * * *